United States Patent
Aviv (10) Patent No.: US 9,053,354 B2
(45) Date of Patent: Jun. 9, 2015

(54) FAST FACE DETECTION TECHNIQUE

(75) Inventor: Ziv Aviv, Bat Hefer (IL)

(73) Assignee: Intel Corporation, Santa Clara, CA (US)

( * ) Notice: Subject to any disclaimer, the term of this patent is extended or adjusted under 35 U.S.C. 154(b) by 833 days.

(21) Appl. No.: 13/113,724

(22) Filed: May 23, 2011

(65) Prior Publication Data

US 2012/0300090 A1 Nov. 29, 2012

(51) Int. Cl.
*G06K 9/34* (2006.01)
*G06K 9/00* (2006.01)

(52) U.S. Cl.
CPC .................................. *G06K 9/00228* (2013.01)

(58) Field of Classification Search
CPC ....................................................... G06K 9/34
USPC .......................................................... 382/173
See application file for complete search history.

(56) References Cited

U.S. PATENT DOCUMENTS

| 2004/0208361 A1* | 10/2004 | Buzuloiu et al. | 382/165 |
| 2007/0189609 A1* | 8/2007 | Ito et al. | 382/224 |
| 2008/0240571 A1* | 10/2008 | Tian et al. | 382/190 |
| 2010/0172578 A1* | 7/2010 | Reid et al. | 382/165 |

OTHER PUBLICATIONS

Detecting Faces in Images: A Survey. Ming-Hsuan Yang, Member, IEEE, David J. Kriegman, Senior Member, IEEE, and Narendra Ahuja. Jan. 2002.*
A Robust Skin Color Based Face Detection Algorithm. Sanjay Kr. Singh, D. S. Chauhan, Mayank Vatsa, Richa Singh. 2003.*

* cited by examiner

*Primary Examiner* — Stephen R Koziol
*Assistant Examiner* — Delomia Gilliard
(74) *Attorney, Agent, or Firm* — Douglas J. Ryder; Ryder, Lu, Mazzeo & Konieczny LLC (57) ABSTRACT

A processor includes a face recognition block and a face detection block. The face detection block includes a scan block and control logic. The scan block may divide an image into a plurality of rectangles, determine whether at least some pixel values in each of the plurality of rectangles is within an allowable skin tone range, reject one or more of the plurality of rectangles, which do not contain pixels having a value within the allowable skin tone range, and mark remaining of the plurality of rectangles as component rectangles of a human face. Further, the scan block is to determine variability of the component rectangles, compare the variability of the component rectangles with a variability threshold, reject one or more of the component rectangles whose variability is less than the variability threshold, and retain remaining component rectangles as features of the human face.

23 Claims, 4 Drawing Sheets

FAST FACE DETECTION TECHNIQUE

BACKGROUND

Wide ranges of applications such as video indexing and still image indexing use face detection techniques. For example, the image capturing devices detect face regions in an image to set the capture parameters. A common need in such applications is to detect the face in an image quickly. Tracking techniques may be used but such tracking techniques may be highly demanding memory-wise and such techniques may not work well if the scene changes or image indexing face detection for content mining. Some prior approaches have not been very effective in increasing the processing speed, for example, to 30 frames per second.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes embodiments of a fast face detection technique. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other similar signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

An imaging device such as a camera, a scanner, a smart phone, a handheld device, net book, note book, laptop, desktop, and such other computing devices may support image capturing, object detection (for example, face detection), object recognition (for example, face recognition) for several purposes. Such purposes may include biometric authentication, searching for an image in huge databases, image indexing, auto-focus, and tracking of faces among many other applications.

In one embodiment, the time consumed while processing a face detection technique may be dependent on two factors—(1) the complexity of each cascade level; and (2) the number of rectangles (each rectangle representing an area in the image) rejected at each cascade level. In one embodiment, the fast face detection technique described below may increase the number of rectangles rejected at the lower cascade levels and the complexity of at least some of the cascade levels may be reduced. In one embodiment, the number of rectangles, which may be rejected at a lower cascade levels may be increased by using additional features such as skin tone probability and variability value of the pixels within a selected rectangle.

In one embodiment, the fast face detection technique embodied in a imaging device may perform a scan operation (first level cascade) in response to receiving an integral image of variability, skin tone, and gray value. In one embodiment, the scan may be applied to all rectangles in a raster manner to increase the rejection rate of the rectangles. In one embodiment, the rejection rate may be increased by using color (or skin tone) and variability parameters as a criteria for rejection. In one embodiment, a pixel within a selected rectangle is skin tone pixel if the color of the pixel is within an allowable skin tone range. In one embodiment, the color of the pixel is determined based on the UV (chrominance) components of the YUV values of a pixel. In one embodiment, it may be determined that the pixel is a human skin tone pixel if the UV value of the pixel is within the allowable range of the UV plain. In one embodiment, the allowable range in the UV plain may be selected such that the likelihood of rejecting a facial pixel to avoid screening of facial region. In one embodiment, using the skin tone as a criteria for rejection of rectangles may enable rejection of more than one rectangle in a single scan operation. In one embodiment, the entire image may be rejected in a single scan if the image does not include a human face In one embodiment, the next cascade level may represent a verification phase. In one embodiment, in the verification phase, the variability value for each rectangle may be determined and then the variability value may be compared with the threshold variability value to determine whether the rectangle may be retained or rejected. In one embodiment, the variability value of each rectangle may equal a sum of the local variability of pixels in the rectangle. In one embodiment, the sum of local variability of pixels in the rectangle may be equal to sum of absolute value of sobel derivatives. In one embodiment, the sum of variability values may be determined using an integral image of the pixel variability. In one embodiment, the human face may be a non-flat region and rectangles having a variability value lower than a threshold variability value may be rejected as not a portion of the human face. In one embodiment, the rectangles having a variability value higher than a threshold variability value may be marked as a component portion or component rectangle of the human face. Further, within the human face, the variability values may be used to determine the feature areas (for example, eyes) in the human face and non-feature areas (for example, the cheeks) of the human face. In one embodiment, to enhance the efficiency of detection of features in the human face, the variability values along the horizontal and vertical directions or any other such directions such as diagonals may also be determined and used. As a result of using the spatial features of the human face efficiently, the fast face detection technique described above may quickly detect the human face in an image using a single image and such an approach may also enhance the tracking methods.

Figure 1:
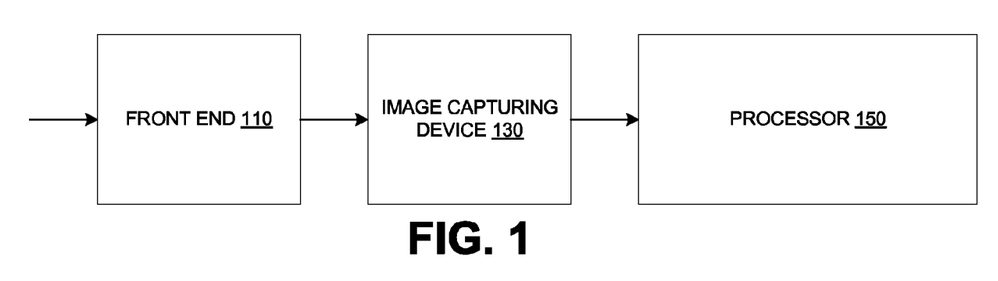
FIG. 1 illustrates an imaging device, which supports fast face detection technique in accordance with one embodiment.

An embodiment of an imaging device, which may support fast face detection technique is illustrated in FIG. 1. In one embodiment, the imaging device may include a front end 110, and image capturing device 130, and a processor 150. In one embodiment, the front end 110 may include a lens/optics to focus the light reflected from the image on the image capturing device 130. In one embodiment, the image capturing device 130 may include, for example, a charge coupled device (CCD), which may capture the image based on the light intensity incident on the CCD through the optics. In one embodiment, the image so captured may be provided to the processor 150 for further processing.

In one embodiment, the processor 150 may receive an image captured by the image capturing device 130 and perform a fast face detection technique described below in detail to determine if the image includes a human face. In one embodiment, the processor 150 may extract the features of the human face if the image comprises a human face and the features of the face may be used to recognize the human face. In one embodiment, the processor 150 may determine if a matching human face exists for the human face detected in the image using the fast face detection technique. In other embodiments, the processor 150 may identify and/or track the human faces in an image.

Figure 2:
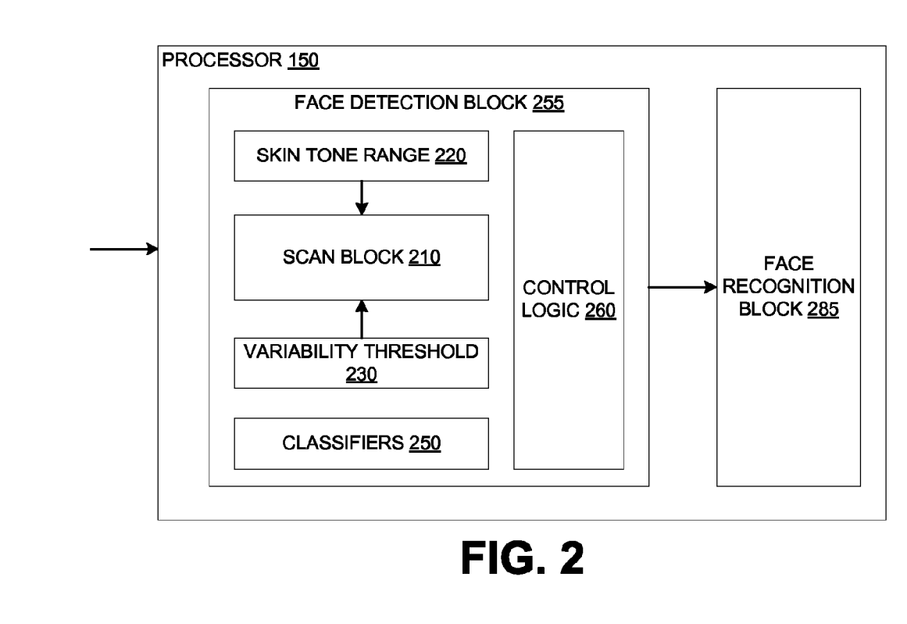
FIG. 2 illustrates a processor, which supports fast face detection technique in accordance with one embodiment.

An embodiment of a processor 150, which may enable fast face detection technique, is illustrated in FIG. 2. In one embodiment, the processor 150 may include a face detection block 255 and a face recognition block 285. In one embodiment, the face detection block 255 may quickly determine whether a human face is present in the image and the face detection block 255 may detect the face in an image based on the skin tone value and variability values. In one embodiment, the face detection block 255 may comprise a scan block 210, a skin tone range 220, a variability threshold 230, a classifier 250, and a control logic 260.

In one embodiment, the time consumed while processing a face detection technique may be dependent on two factors—(1) the complexity of each cascade level; and (2) the number of rectangles (each rectangle representing an fractional area in the image) rejected at each cascade level.

Time consumed=$\Sigma_{Levels}$(Complexity (of cascade levels)*rectangles tested (in each cascade level)) Equation (1)

In one embodiment, to accelerate the face detection speed, the number or rectangles tested and rejected at lower cascade levels may be increased using additional criteria or features like color (or skin tone range) and variability. In one embodiment, the criteria for rejection of the rectangles at the first level (or lower level) cascade may be selected to enable efficient vectorization using for example, single instruction multiple data (SIMD) operations.

In one embodiment, the control logic 260 may initiate, control, and coordinate the operation of the other blocks 210 and 250 in the face detection block 255. In one embodiment, the control logic 260 may determine the skin tone range 220 and variability threshold 230. In one embodiment, the control logic 260 may create classifiers based on the output provided by the scan block 210. In one embodiment, the control logic 260 may select the allowable skin tone range to reduce the likelihood of rejecting one or more of the plurality of rectangles, which form at least a portion of the human face. In one embodiment, the control logic 260 may select the allowable skin tone range to increase the likelihood of rejecting one or more of the plurality of rectangles, which do not form a portion of the human face.

Figure 3:
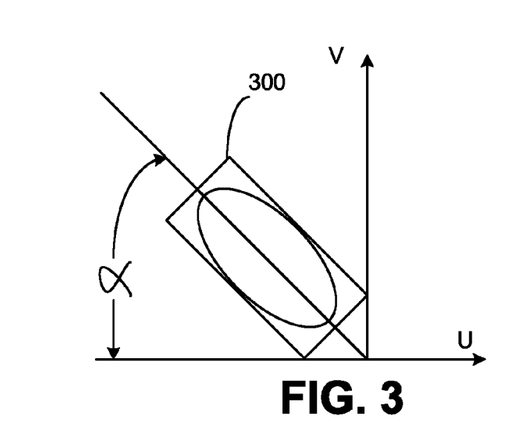
FIG. 3 illustrates a skin tone rectangle in U-V plane, which may be used to quickly reject the portions other than the face in an image in accordance with one embodiment.

In one embodiment, the scan block 210 may perform a scan operation on the image to determine whether the image includes a human face. In one embodiment, to facilitate an efficient scan operation, the scan block 210 may divide the image into multiple rectangles, which may be arranged in the form of rows and columns. In one embodiment, the scan block 210 may test the rectangles by performing the scan operation row-wise starting from the left edge to the right edge of the image. In one embodiment, the scan block 210 may select a first rectangle of the first row and compare the pixel value of each pixel within the first rectangle with an allowable skin tone range provided by the skin tone range 220. In one embodiment, the scan block 210 may reject the selected rectangle if the pixel value of each of the pixels in the selected rectangle is outside the allowable skin tone range 220. In one embodiment, the allowable skin tone range may be determined based on the UV (chrominance) components and a selected pixel is a skin tone pixel if the UV value of that pixel is within the allowable skin tone range. In one embodiment, the allowable skin tone range may be represented by a rectangle 300 depicted in FIG. 3, in which the value of "U" is plotted on the X-axis and the value of "V" is plotted in the Y-axis.

In other embodiments, to scan the image quickly, the scan block 210 may select two or more of the rectangles from the first row and compare the pixel value of such pixels with the skin tone range 220, simultaneously or substantially simultaneously, and reject all the selected rectangles if the pixel value of each of the pixels in the selected rectangle is outside the allowable skin tone range 220. In yet another embodiment, the scan block 210 may also select one or more rectangles from any of the rows and compare the pixel value of such pixels with the skin tone range 220, simultaneously or substantially simultaneously, and reject all the selected rectangles if the pixel value of each of the pixels in the selected rectangle is outside the allowable skin tone range 220.

In one embodiment, the scan block 210 may create a list data structure and the identifier of the rectangles, which are not rejected, may be added to the list. In one embodiment, the scan block 210 may then determine the variability of the rectangles, which are identified by identifiers in the list data structure. In one embodiment, the variability of a rectangle may be determined as a sum of the local variability of pixels in that rectangle. In one embodiment, the variability of the rectangle may be determined as a sum of absolute value of sobel derivatives. In one embodiment, the variability of each rectangle may be determined using an integral image of the pixel variability.

In one embodiment, the scan block 210 may select a rectangle based on the identifier stored in the list, compare the variability of the rectangle with a variability threshold, and if the variability of the rectangle is less than the variability threshold value, the selected rectangle may be rejected and the list may be updated. In one embodiment, after the skin tone based scanning, the list may comprise the identifiers of the rectangles, which may be a portion of the human face. The human face is a non-flat region with many high variability regions. In one embodiment, such high variability regions may comprise unique features (such as eyes, lips, for example), which may be effectively used in face recognition. Thus, in one embodiment, such high variability rectangles may be retained while rejecting the low variability regions. As a result, in one embodiment, the face detection block 255 may detect the human face in an image and also identify key features in the human face.

In one embodiment, the scan block 210 may increase the efficiency of identifying or separating out the features by determining the variability of the rectangles as a sum of horizontal and vertical variability. In other embodiments, the scan block 210 may determine the variability of the rectangles as a sum of variability of pixels along the horizontal, vertical, and diagonal and/or any other such directions. In one embodiment, the scan block 210 may extract features in the human face based on the variability along the horizontal and vertical directions and a mathematical representation of such a feature extraction is given below in Equation (2).

$$F = \alpha \sum_{x=a, y=b}^{x=c, y=d} d\_var_1 - \beta \sum_{x=a_1, y=b_1}^{x=c_1, y=d_1} d\_var_2 \qquad \text{Equation (2)}$$

wherein d_var1 represents horizontal variability and d_var2 represents vertical variability and the sum may be determined using the integral image.

In one embodiment, the control logic 260 may create a weak classifier (WC) based on the feature F determined using Equation (2) above. In one embodiment, the weak classifier may represent a Boolean decision function, which may exhibit a success probability of about 50%. However, a combination of multiple such weak classifiers may provide a strong classifier with higher success probability. In one embodiment, the weak classifier may be used as a basic element of a boosting algorithm. In one embodiment, the weak classifier may be given by Equation (3) below.

$$WC = \begin{cases} F > 0 & c_p \\ F < 0 & c_n \end{cases} \qquad \text{Equation (3)}$$

wherein Cp and Cn, respectively, represent threshold, which may be constant values and the constant values may be calculated during the training phase. In one embodiment, the value of Cp and Cn may be different for each weak classifier.

In one embodiment, the control logic 260 may create a level classifier (LC) based on the weak classifier. In one embodiment, the level classifier may be given by Equation (4) below.

$$LC = \begin{cases} \sum WC > th & \text{TRUE} \\ \sum WC < th & \text{FALSE} \end{cases} \qquad \text{Equation (4)}$$

wherein 'th' represents a threshold, which may be a constant value.

As described above, using efficient spatial features such as skin tone and variability may enable creation of efficient classifiers such as the weak classifier and level classifier 250, which may utilize vector instructions supported by the processor 150. Also, such an approach may reduce the number of tests required to detect a human face in the image. In one embodiment, such an approach may allow creation of less complex and efficient face detectors. Also, such an approach may allow independent face detection based on a single image in real time, with high probability of detection rate and false alarm.

Figure 4:
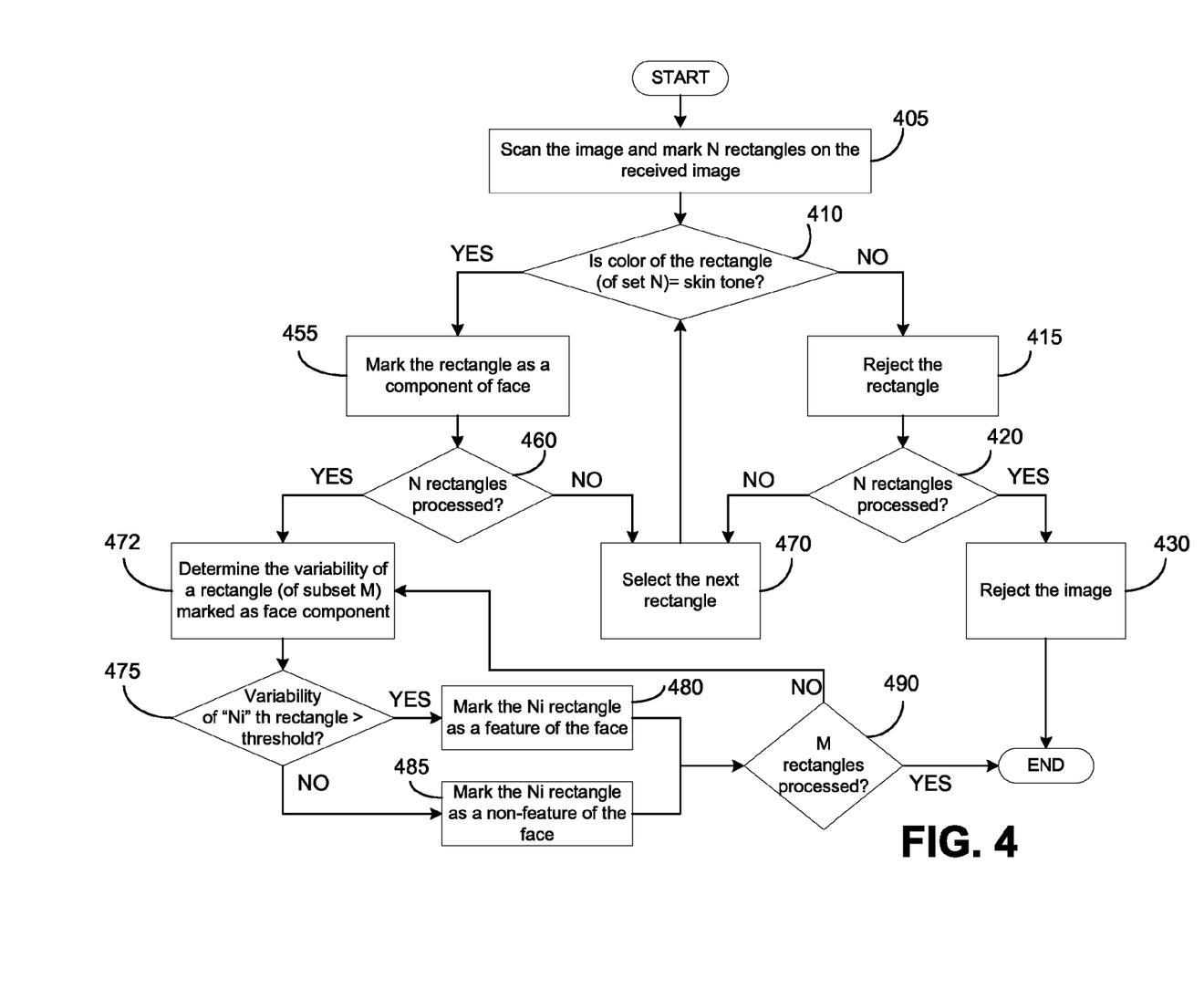
FIG. 4 illustrates a flow-chart, which depicts a technique supported by the imaging device to enable detection of faces, quickly in accordance with one embodiment.
Figure 5:
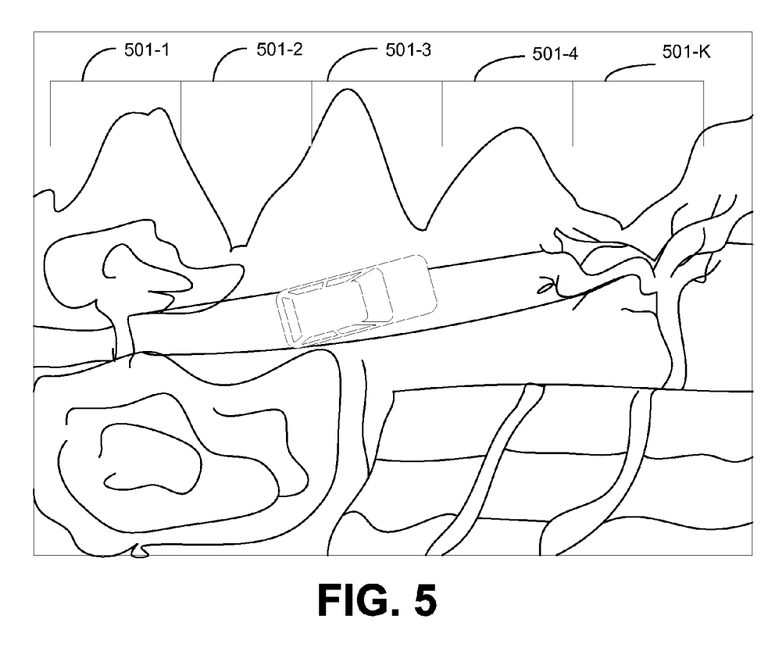
FIG. 5 illustrates a computing system, which may support detection of faces, quickly in accordance with one embodiment.

An embodiment of an operation of the processor 150 in detecting a human face in an image quickly is illustrated in a flow-chart of FIG. 4. In block 405, the scan block 210 may scan the image and mark N rectangles on the image. For example, the scan block 210 may scan the image as shown in FIG. 5 and mark N rectangles such as 501-1 to 501-K in the first row. Similarly, the scan block 210 may mark the rectangles in the form of M rows and the total number of rectangles so marked may equal N.

In block 410, the scan block 210 may compare the pixel value (UV values) of each pixel in the rectangle with a skin tone range and control passes to block 415 if the pixel value of all the pixels in the selected rectangle is outside the skin tone range 220, for example. Control passes to block 455 if at least one pixel value is within the skin tone range.

In block 415, the scan block 210 may reject the rectangle as the pixel value of each pixel in the rectangle is outside the skin tone range. In one embodiment, the scan block 210 may compare the pixel value of each pixel in one or more rectangles simultaneously or in parallel and may reject more than one rectangle together if the rectangles so selected do not comprise any skin tone pixels. For example, the rectangles 501-1 to 501-K in row-1 of the image depicted in FIG. 5 may be simultaneously examined and rejected in parallel as the rectangles 501-1 to 501-K may not include any skin tone pixels. In other embodiment, the scan block 210 may simultaneously examiner all the N rectangles and reject all the N rectangles together (i.e., the image in FIG. 5) as the N rectangles may not include any skin tone pixels.

In block 420, the scan block 210 may check whether all the N rectangles in the image are processed and control passes to block 430 if all the N rectangles are processed and to block 470 otherwise. In block 430, the scan block 210 may reject the image. In one embodiment, the scan block 210 may reject the entire image after examining all the N rectangles.

Figure 6A:
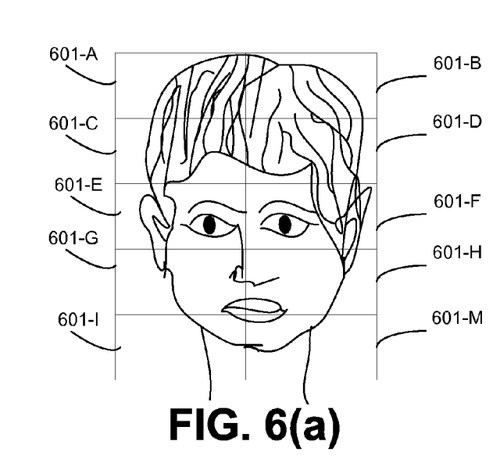
FIGS. 6(a) and 6(b), respectively, represent a human face in which rectangles (portions) identified on the human face are evaluated based on the skin tone color and variability.

In one embodiment, the block 455 may be reached if the color or the pixel value of any pixel in the rectangle is within the allowable skin tone range. In one embodiment, if the image such as the one shown in FIG. 5 includes a human face depicted in FIG. 6a, the comparison in block 410 may result in a yes condition and the control passes to block 455. In block 455, the scan block 210 may mark the rectangle as a component of a human face. For example, a rectangle marked on the FIG. 6a included in an image, which may be scanned, may result in the rectangle being marked as a component rectangle.

In one embodiment, if the scan block 210 determines that the selected rectangle includes at least one skin tone pixel, the scan block 210 may mark the rectangle as a component of human face and the identifier of such a component rectangle may be added to the link data structure, which may be created for maintaining a list of all the component rectangles of the human face. In one embodiment, the rectangles marked on the human face of FIG. 6a may be identified as component rectangles and the identifier of each component rectangle may be stored in the list data structure.

In block 460, the scan block 210 may check whether all the N rectangles in the image are processed and control passes to block 472 if all the N rectangles are processed and to block 470 otherwise. In block 470, the scan block 210 may select the next rectangle and control passes to block 410.

In block 472, the scan block 210 may determine the variability of a rectangle that is marked as a component rectangle. In one embodiment, the scan block 210 may determine the variability of the component rectangle 601-A of the human face. In other embodiment, to increase the speed of operation, the scan block 210 may determine the variability of all the 'M' component rectangles of the human face. For example, the scan block 210 may determine the variability value for all the component rectangles 601-A to 601-M of the human face of FIG. 6a.

In block 475, the scan block 210 may compare the variability of the component rectangle 601-A with a variability threshold value, such as the variability threshold 230. If the variability of the component rectangle 601-A is greater than the variability threshold control passes to block 480, and if the variability of the rectangle 601-A is less than the variability threshold control passes to block 485. In one embodiment, the scan block 210 may also compare the variability of the component rectangles 601-1 to 601-M with the variability threshold simultaneously.

Figure 6B:
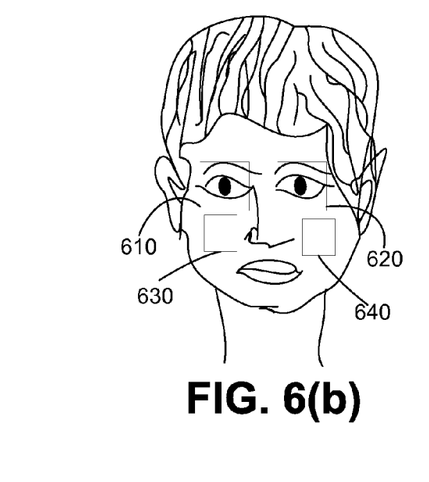

In block 480, the scan block 210 may mark the component rectangle 601-A as a feature of the human face and control passes to block 490. In one embodiment, the component rectangle 601-E and 601-F of human face may be marked as a feature as the component rectangles 601-E and 601-F may, respectively, include high variability portions such as the right eye 610 and left eye 620 as shown in FIG. 6b.

In block 485, the scan block 210 may mark the component rectangle 601-A as a non-feature of the human face and control passes to block 490. In one embodiment, the component rectangle 601-G and 601-H of human face may be marked as a non-feature as the component rectangles 601-G and 601-H may, respectively, include low variability portions such as the right cheek 630 and left cheek 640 as shown in FIG. 6b.

In block 490, the scan block 210 may check whether 'M' rectangles have been compared and control passes to block 472 if the more component rectangles among the M rectangles are to be compared yet and the process ends otherwise.

Figure 7:
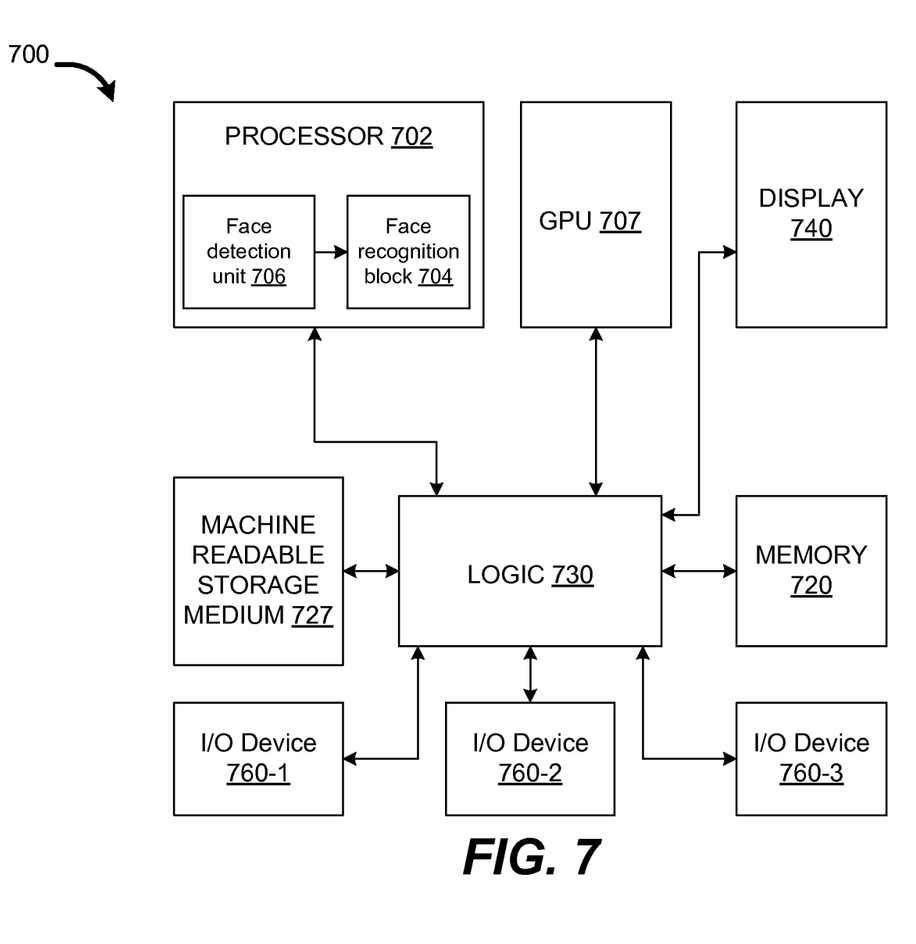
FIG. 7 illustrates a computing system, which may support face detection techniques in accordance with one embodiment.

Referring to FIG. 7, a computer system 700 may include a general purpose processor 702 including a single instruction multiple data (SIMD) processor and a graphics processor unit (GPU) 705. The processor 702, in one embodiment, may include a face detection unit 706 and face recognition block 704 and the face detection unit 706 to perform face detection and recognition operations in addition to performing various other tasks or store a sequence of instructions, to provide face detection and recognition operations in a machine readable storage medium 725. However, the sequence of instructions may also be stored in the memory 720 or in any other suitable storage medium.

While a separate graphics processor unit 705 is depicted in FIG. 7, in some embodiments, the graphics processor unit 705 may be used to perform face detection and recognition operations, as another example. The processor 702 that operates the computer system 700 may be one or more processor cores coupled to logic 730. The logic 730 may be coupled to one or more I/O devices 760, which may provide interface the computer system 700. In one embodiment, the I/O devices 760 may include a front end comprising optics (lens) for capturing the devices and the logic 730 may include charge coupled devices (CCD) to store the light information formed by the image. The logic 730, for example, could be chipset logic in one embodiment. The logic 730 is coupled to the memory 720, which can be any kind of storage, including optical, magnetic, or semiconductor storage. The graphics processor unit 705 is coupled through a frame buffer to a display 740.

In one embodiment, the processor 702 may include a face detection unit 706 and face recognition unit 704. In one embodiment, the processor 702 (or the face detection unit 706) may process the image and detect the human face in the image based on the scan and verification process described above. In one embodiment, as described above the scan operation may be performed to quickly reject the rectangles in the image that may not include skin tone pixels based on the allowable skin tone range and retain the component rectangles that include skin tone rectangles. Further, in one embodiment, the verification process may be performed to identify the features in the human face from among the component rectangles identified by the scan operation.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A processor comprising:
 a face recognition block, and
 a face detection block coupled to the face recognition block, wherein the face detection block includes a scan block to
 divide an image into a plurality of rectangles,
 for rectangles of the plurality of rectangles the image is divided into
 compare pixel values for pixels making up a rectangle to an allowable skin tone range,
 reject the rectangle as not being a component of a human face, if the rectangle does not include at least one pixel having a pixel value within the allowable skin tone range, and
 mark the rectangle as being a component of the human face, if the rectangle includes at least one pixel having a pixel value within the allowable skin tone range, and for rectangles marked as being a component of the human face
    determine variability of a rectangle,
    compare the variability of the rectangle to a variability threshold,
    reject the rectangle as not being a feature of the human face, if the variability is less than the variability threshold, and
    mark the rectangle as being a feature of the human face, if the variability is greater than the variability threshold.

2. The processor of claim 1, wherein the allowable skin tone range is a range of chrominance values (U and V).

3. The processor of claim 1, wherein the face detection block further includes a control logic to select the allowable skin tone range.

4. The processor of claim 3, wherein the control logic is to select the allowable skin tone range to
    increase likelihood of rejecting the rectangle as not being a component of the human face if the rectangle does not include a portion of the human face; and
    decrease likelihood of rejecting the rectangle as not being a component of the human face if the rectangle includes a portion of the human face.

5. The processor of claim 1, wherein the scan block is to reject the image in a single scan if none of the plurality of rectangles includes pixels having a pixel value within the allowable skin tone range.

6. The processor of claim 1, wherein the scan block is to detect the presence of the human face within an image using a single image.

7. The processor of claim 3, wherein the control logic is further to generate a weak classifier for rectangles marked as being a component of the human face, wherein the weak classifier for a rectangle is based on the variability determined for the rectangle, wherein the variability is determined along a horizontal and vertical direction within the rectangle, and wherein the face detection block further includes a classifier to maintain the weak classifier.

8. The processor of claim 7, wherein the control logic is further to generate a level classifier based on the weak classifier, and wherein the classifier is further to maintain the level classifier.

9. A computing system supporting imaging, comprising:
    a front end block including one or more lens to capture an image,
    an image capturing block coupled to the front end, wherein the image capturing block is to generate and store electrical signals corresponding to the image, and
    a processor coupled to the image capturing block, wherein the processor is to,
        divide an image into a plurality of rectangles,
        for rectangles of the plurality of rectangles the image is divided into
            compare pixel values for pixels making up a rectangle to an allowable skin tone range,
            reject the rectangle as not being a component of a human face, if the rectangle does not include at least one pixel having a pixel value within the allowable skin tone range, and
            mark the rectangle as being a component of the human face, if the rectangle includes at least one pixel having a pixel value within the allowable skin tone range, and
        for rectangles marked as being a component of the human face
            determine variability of a rectangle,
            compare the variability of the rectangle to a variability threshold,
            reject the rectangle as not being a feature of the human face, if the variability is less than the variability threshold, and
            mark the rectangle as being a feature of the human face, if the variability is greater than the variability threshold.

10. The computing system of claim 9, wherein the allowable skin tone range is a range of chrominance values (U and V).

11. The computing system of claim 9, wherein the processor is further to select the allowable skin tone range.

12. The computing system of claim 11, wherein the processor is to select the allowable skin tone range to
    increase likelihood of rejecting the rectangle as not being a component of the human face if the rectangle does not include a portion of the human face; and
    decrease likelihood of rejecting the rectangle as not being a component of the human face if the rectangle includes a portion of the human face.

13. The computing system of claim 9, wherein the processor is to reject the image in a single scan if none of the rectangles includes pixels having a pixel value within the allowable skin tone range.

14. The computing system of claim 9, wherein the processor is to detect the presence of the human face within an image using a single image.

15. The computing system of claim 9, wherein the processor is further to generate a weak classifier for rectangles marked as being a component of the human face, wherein the weak classifier for a rectangle is based on the variability determined for the rectangle, wherein the variability is determined along an horizontal and vertical direction within the rectangle.

16. The computing system of claim 15, wherein the processor is further to generate a level classifier based on the weak classifier.

17. A method in an imaging system, comprising:
    dividing an image into a plurality of rectangles in response to receiving the image,
    for rectangles of the plurality of rectangles the images is divided into
        comparing pixel values for pixels making up a rectangle to an allowable skin tone range,
        rejecting the rectangle as not being a component of a human face, if the rectangle does not include at least one pixel having a pixel value within the allowable skin tone range, and
        marking the rectangle as being a component of the human face, if the rectangle includes at least one pixel having a pixel value within the allowable skin tone range, and
    for rectangles marked as being a component of the human face
        determining variability of a rectangle,
        comparing the variability of the rectangle to a variability threshold,
        rejecting the rectangle as not being a feature of the human face, if the variability is less than the variability threshold, and
        marking the rectangle as being a feature of the human face, if the variability is greater than the variability threshold.

18. The method of claim 17, wherein the allowable skin tone range is a range of chrominance values (U and V).

19. The method of claim 17, further comprising selecting the allowable skin tone range to
   reduce likelihood of rejecting the rectangle as not being a component of the human face if the rectangle includes a portion of the human face, and
   increase likelihood of rejecting the rectangle as not being a component of the human face if the rectangle does not include a portion of the human face.

20. The method of claim 17, further comprises rejecting the image in a single scan if none of the rectangles includes pixels having a pixel value within the allowable skin tone range.

21. The method of claim 17, further comprising detecting the presence of the human face within an image using a single image.

22. The method of claim 17, further comprising creating a weak classifier for rectangles marked as being a component of the human face, wherein the weak classifier for a rectangle is based on the variability determined for the rectangle, wherein the variability is determined along a horizontal and vertical direction within the rectangle.

23. The method of claim 22, further comprises creating a level classifier based on the weak classifier.

* * * * *